(12) United States Patent
Haartsen

(10) Patent No.: US 6,983,151 B2
(45) Date of Patent: Jan. 3, 2006

(54) METHOD, APPARATUS AND SYSTEM FOR SYNCHRONIZATION IN RADIO COMMUNICATION SYSTEMS

(75) Inventor: Jacobus Haartsen, Hardenberg (NL)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 698 days.

(21) Appl. No.: 09/840,399

(22) Filed: Apr. 23, 2001

(65) Prior Publication Data
US 2002/0155850 A1 Oct. 24, 2002

(51) Int. Cl.
*H04Q 7/20* (2006.01)

(52) U.S. Cl. .................... 455/452.1; 714/746

(58) Field of Classification Search ........... 455/502, 455/500, 524, 525, 421, 450, 452.1, 452.2, 455/63.1, 561; 370/389, 442, 465, 335, 342, 370/316, 318, 252, 328; 375/148, 285, 295, 375/260; 714/746, 776

See application file for complete search history.

(56) References Cited

U.S. PATENT DOCUMENTS

| | | | |
|---|---|---|---|
| 5,416,787 A * | 5/1995 | Kodama et al. ........... 714/790 |
| 5,541,967 A | 7/1996 | Gluska et al. | |
| 5,841,378 A * | 11/1998 | Klayman et al. ........... 341/61 |
| 5,862,132 A * | 1/1999 | Blanchard et al. ......... 370/342 |
| 6,134,286 A | 10/2000 | Chennakeshu et al. | |
| 6,137,847 A | 10/2000 | Stott et al. | |
| 6,144,650 A | 11/2000 | Watanabe et al. | |
| 6,154,468 A | 11/2000 | Lin et al. | |
| 6,353,637 B1 * | 3/2002 | Mansour et al. ........... 375/260 |
| 6,381,455 B1 * | 4/2002 | Smolik .................. 455/421 |
| 6,545,990 B1 * | 4/2003 | Amalfitano et al. ........ 370/335 |

(Continued)

FOREIGN PATENT DOCUMENTS

JP 04 196927 A 10/1992

(Continued)

OTHER PUBLICATIONS

Takatuki Nagayasu et al., "Performance of 16QAM with Decision Feedback Equalizer Using Interpolation for Land Mobile Communications" from Pioneers to the 21st Century., Denver, May 10-13, 1992, Preoceedings of the Vehicular Technology Society Conference(VTSC), New York, IEEE, US, vol. 1, Conf. 42, May 10, 1992, pp. 384-387.

*Primary Examiner*—Nguyen T. Vo
*Assistant Examiner*—Tan Trinh
(74) *Attorney, Agent, or Firm*—Potomac Patent Group PLLC

(57) ABSTRACT

Method, apparatus, and system for synchronization in radio communication systems are presented. The method includes the steps of encapsulating symbols in an information stream then modulating the stream. The modulated information stream is then sent over a communication channel at a first robustness level, and the level of robustness of the information stream is then reduced to a second robustness level according to a predetermined function. The modulated information stream is received from the communication channel. The information stream is then demodulated after a first number of symbols have been received, wherein the first number of symbols is less than a second number of symbols that would have to be received to demodulate a corresponding information stream sent over the communication channel only at the second robustness level.

29 Claims, 8 Drawing Sheets

U.S. PATENT DOCUMENTS

| | | | |
|---|---|---|---|
| 6,646,995 B1 * | 11/2003 | Le Strat et al. | 370/252 |
| 6,647,070 B1 * | 11/2003 | Shalvi et al. | 375/285 |
| 6,724,737 B1 * | 4/2004 | Boyden et al. | 370/316 |
| 2001/0046879 A1 * | 11/2001 | Schramm et al. | 455/525 |
| 2002/0136231 A1 * | 9/2002 | Leatherbury et al. | 370/442 |
| 2002/0136276 A1 * | 9/2002 | Franceschini et al. | 375/148 |
| 2002/0159614 A1 * | 10/2002 | Bradley et al. | 382/100 |
| 2002/0181609 A1 * | 12/2002 | Tzannes | 375/295 |
| 2003/0002495 A1 * | 1/2003 | Shahar et al. | 370/389 |
| 2003/0036397 A1 * | 2/2003 | Takahashi | 455/502 |

FOREIGN PATENT DOCUMENTS

| | | |
|---|---|---|
| WO | 96/08904 A | 3/1996 |
| WO | 01/26273 A | 4/2001 |

* cited by examiner

METHOD, APPARATUS AND SYSTEM FOR SYNCHRONIZATION IN RADIO COMMUNICATION SYSTEMS

BACKGROUND

The present invention relates generally to a method, apparatus, and system for synchronization in radio communication systems. In particular, the present invention relates to a method, apparatus, and system for synchronization in radio communication systems using a variably robust information stream.

Over the past decades, advancements in radio and VLSI technology has fostered widespread use of radio communication in consumer electronics. Portable devices, such as mobile telephones, are now widely available offering acceptable cost, size, and power consumption levels.

The first mobile telephones available for public use were analog telephones. These first generation telephones used various analog-based access technologies, e.g., AMPS, NMT, and TACS, to exchange information within a communication region. Consumer interest in mobile radio communication increased dramatically in the 1990's with the introduction of new digital mobile telephones. These second generation telephones used more robust, more secure, and faster digital access technologies, e.g., GSM, D-AMPS, and PDC, to exchange both voice and data information. Although consumer use of radio technology is predominantly in the area of voice communication (at least with respect to handheld devices), the wireless exchange of data is likely to greatly expand in the near future as a result of further technological advances.

Synchronization of the information stream between radio devices is of great importance in any radio communication system. In order to properly recover the information stream sent by a transmitting device, a receiving device must synchronize to the incoming communication signals.

For example, with the so-called continuous wave (CW) radio systems, e.g., first generation analog cordless phones, and the more modern direct-sequence CDMA systems, synchronization of the information stream occurs once at the establishment of a connection. In CW radio systems, a radio receiver initially synchronizes to the received transmission from a radio transmitter signal upon connection establishment. Thereafter, a tracking mechanism is used to maintain synchronization between the radio receiver and transmitter.

In contrast to CW radio systems, so-called packet or burst based radio systems, transmit information between devices in short bursts. In packet-based systems, synchronization is required upon the receipt of each information burst. An efficient synchronization method is therefore essential, in order to minimize the amount of overhead that must be included in the burst to achieve synchronization. The demodulation of the received information stream will be significantly impaired by errors until the synchronization process has been finalized. This will be true even under best transmission conditions, e.g., when the signal-to-noise ratio of the received signal is quite high.

Synchronization is required in radio communication systems because of modulation frequency and timing offsets that exist between the transmitter and receiver devices. Frequency offsets may occur in the received signal as a result of differences in the local oscillator frequencies of the transmitter and receiver devices. These frequency offsets may cause the received signal to not be centered within the band-pass of the receive filters, and may further result in rotating constellations and accumulating phase errors in the demodulated signal. Timing offsets can cause the received symbols to be sampled at sub-optimal sampling intervals, e.g., at sampling intervals where the received symbols are more susceptible to noise and interference, resulting in sampling errors.

Synchronization schemes may be divided into two broad categories. The first category includes the so-called data-aided synchronization schemes. These schemes use known symbol sequences that are inserted within the information stream, e.g. in a packet, to synchronize the data transmission between transmitter and receiver. The known data stream is used to "train" the receiver, that is, to aid the receiver in determining the frequency and timing offsets in the received signal. Hence, these known sequences are often referred to as training sequences.

These training sequences may be inserted at the beginning of the information stream as shown in the packet 102 of FIG. 1. Examples of transmission schemes that organize the information stream in this manner include radio systems based on Bluetooth™, WLAN 802.11, and HIPERLAN2. Alternatively, the training sequences may be inserted in the middle of the information stream as shown in the packet 104 of FIG. 1. This is methodology adopted in the GSM radio system.

Because the information used for the training sequence must be included in the information stream at the expense of the user data, the sequence represents an "overhead" in the communication channel that should be minimized, if at all possible. That is, the number of symbols used to represent the training sequence should be made as small as possible.

The second category of synchronization schemes includes the so-called non-data-aided synchronization schemes. These schemes do not require that any separate, explicit training sequence be included in the information stream for synchronization. As the name suggests, these non-data-aided synchronization schemes use the actual user information stream to train the receiver. Initially, the received information stream may only be used for training the receiver. The stream cannot be immediately demodulated upon receipt because of the errors that would be introduced as a result of the frequency and timing offsets discussed above. Instead, the received information stream must first be stored, and then later demodulated, after the receiver has been fully trained. Thus, the reduction in overhead associated with non-data-aided synchronization schemes comes at the price of increased delay in the demodulation of data and/or increased storage requirements in the receiver.

Not having an explicit training sequence requires that the information streams used to train receivers in non-data-aided synchronization schemes based systems meet certain minimum packet length requirements. That is, the number of symbols in the packet should at least be sufficient for the receiver to train on. Also, the overhead inherent to data-aided synchronization schemes is not completely eliminated with non-data-aided synchronization schemes, as a small frame-delimiter is still required to determine the start of a packet.

One can argue that a form of non-data-aided synchronization is always applied in modern radio communication systems, even when the radio system uses a data-aided scheme of synchronization. This is because most synchronization schemes (both data-aided and non-data-aided) separate the synchronization process into two phases: a coarse phase, and a tracking phase. The second of these two phases, or the tracking phase, does not require that an explicit training sequence exist in the transmitted information stream (i.e., the tracking phase is non-data-aided) in order to maintain synchronization. This is true of the tracking phase whether the coarse phase is data-aided or non-data-aided.

The first of the phases, or the coarse phase, is often alone referred to as "synchronization". During synchronization, a coarse tuning of the receiver to the received signal takes place. The coarse phase of synchronization has a finite duration during which no demodulation of the received information stream occurs. It is not until a requisite degree of synchronization is established between the receiver and transmitter that a successful demodulation of the information stream may begin.

The coarse and tracking phases of the synchronization process are closely related to one another. When the coarse phase is complete, the receiver then enters the tracking phase of the synchronization process. During the tracking phase, certain receiver parameters are continuously updated to maintain an optimal synchronization with the information stream.

As described above, the tracking phase is non-data-aided, requiring only user information symbols in the stream to estimate the receive parameters needed to maintain synchronization. These parameter estimates are sufficiently accurate to allow the received information symbols to be demodulated at the same time the receiver is being fine tuned to the received signal.

Since information symbols may be demodulated at the same time tracking is applied to the user information stream, the amount of overhead in data-aided synchronization schemes, and the storage requirements and minimum packet length requirements in non-data aided schemes, may be reduced by beginning the tracking phase as quickly as possible in the overall synchronization process.

SUMMARY

It is therefore an object of the present invention to reduce the time required to begin tracking, and therefore the time begin demodulation of a received signal, in radio communication systems.

According to an exemplary embodiment of the present invention, this and other objects are met by a method, apparatus, and system for synchronization in radio communication systems, the method including the steps of encapsulating symbols in an information stream then modulating the stream. The modulated information stream is then sent over a communication channel at a first robustness level, and the level of robustness of the information stream is then reduced to a second robustness level according to a predetermined function.

According to another exemplary embodiment, the information stream is divided into a plurality of segments. Forward Error Correction (FEC) coding is added to a plurality of segments in the information stream using at least two different coding rates, and the coding rates among the plurality of segments is varied to change the robustness of the information stream from the first robustness level to the second robustness level. The plurality of segments to which the FEC coding is added may include a segment adjacent to where a demodulation of the information stream begins.

According to yet another exemplary embodiment, a plurality of segments in the information stream is modulated using at least two different modulation schemes, and the modulation schemes are varied among the plurality of segments to change the robustness of the information stream from the first robustness level to the second robustness level. The plurality of segments modulated using at least two different modulation schemes may include a segment adjacent to where a demodulation of the information stream begins.

According to yet another exemplary embodiment, Forward Error Correction (FEC) coding is added to at least one segment in the information stream such that the varying of the modulation schemes and the adding of FEC coding change the robustness of the information stream from the first robustness level to the second robustness level.

According to yet another exemplary embodiment, Forward Error Correction (FEC) coding is added to a plurality of segments in the information stream using at least two different coding rates and the coding rates then varied among the plurality of segments. The varying of the modulation schemes and the varying of the coding rates change the robustness of the information stream from the first robustness level to the second robustness level.

According to yet another exemplary embodiment, the plurality of segments among which the modulation schemes vary and the plurality of segments among which the coding rates vary are different pluralities of segments.

According to yet another exemplary embodiment, the plurality of segments among which the modulation schemes vary and the plurality of segments among which the coding rates vary are the same plurality of segments.

According to yet another exemplary embodiment, the information stream is encoded using convolutional coding at a first coding rate. The encoded information stream is punctured, and the rate at which the encoded information stream is punctured is then varied to achieve a second coding rate, whereby the robustness level is changed from the first robustness level to the second robustness level. The puncturing of the encoded information stream may occur adjacent to a portion of the information stream where a demodulation of the information stream begins.

According to yet another exemplary embodiment, the modulated information stream is received from the communication channel. The information stream is then demodulated after a first number of symbols have been received, wherein the first number of symbols is less than a second number of symbols that would have to be received to demodulate a corresponding information stream sent over the communication channel only at the second robustness level.

According to yet another exemplary embodiment, the information stream may be comprised of packets. The packets may comprise a training sequence.

BRIEF DESCRIPTION OF THE DRAWINGS

The features, objects, and advantages of the invention will become apparent by reading this description in conjunction with the accompanying drawings, in which like reference numerals refer to like elements, and in which.

DETAILED DESCRIPTION

Synchronization of an information stream sent from a radio transmitter to a radio receiver comprises a coarse tuning phase and a fine tuning (or tracking) phase. Synchronization is necessary because of offsets in the modulation frequency and other timing parameters that exist between the transmitter and receiver. Demodulation of the information stream during coarse tuning results in a high probability of creating symbol errors due to these uncompensated offsets. As an increasing number of data symbols arrive at the receiver, however, the receiver is able to train itself to compensate for the frequency and timing offsets, and the error probability decreases. When the error probability reaches an acceptable level, the demodulation process can be begin. The receiver continues to fine tune the synchronization parameters while demodulating the information stream.

Rather than waiting to demodulate the input stream until the coarse tuning phase is complete, Applicant proposes beginning the tracking phase as quickly as possible by making the start of the information stream (or packet) more robust. This in turn allows the demodulation of the information stream to begin more quickly. The lack of accuracy in the synchronization parameters is compensated for by the added robustness of the information stream As more information symbols arrive at the receiver, the synchronization parameters will become more accurate, and the robustness of the information stream may then be gradually reduced.

Robustness of the information stream can be varied in several ways. For example, added robustness may be provided by applying more forward-error correction coding at the beginning of the packet, and then gradually removing the coding bits when progressing into the packet. Alternatively, a more robust modulation (less complex) scheme may be applied at the beginning of the packet, and then gradually switched to more complex modulation when progressing into the packet. Also, a combination of variable modulation and coding (also known as trellis-coded modulation) may be applied to the information stream. Whatever the technique chosen, If the reduction of the robustness follows a predetermined pattern, then no additional signaling information (overhead) is required to send the stream from the transmitter to the receiver.

During synchronization the receiver attempts to estimate a number of signal parameters in the radio signal received. These parameters may include the signal frequency, the signal phase, the symbol timing, and the frame timing of the information stream. For coherent detection, each of these parameters is important to recovering the modulated symbols. For non-coherent detection, however, the phase information is of lesser importance.

Figure 1:
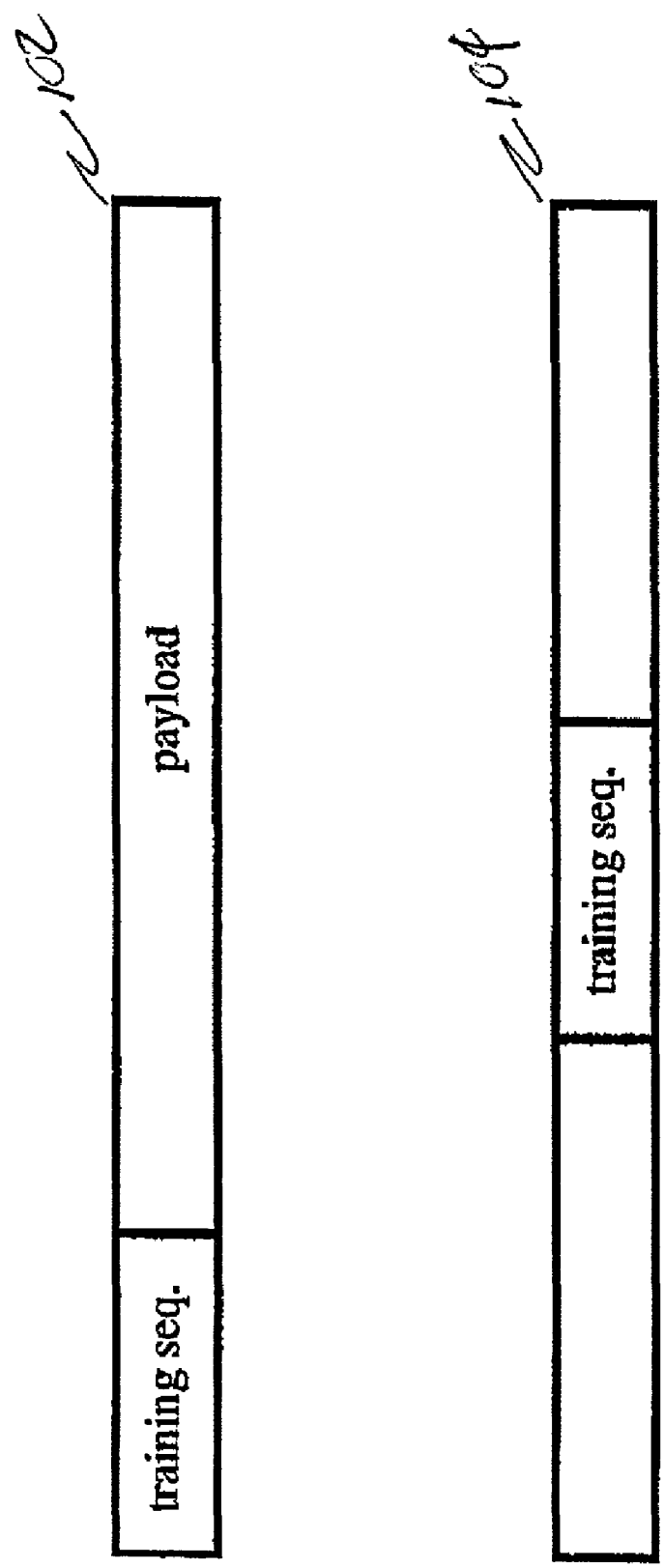
FIG. 1 is a simple diagram of packets having explicit training sequences embedded therein.
Figure 2:
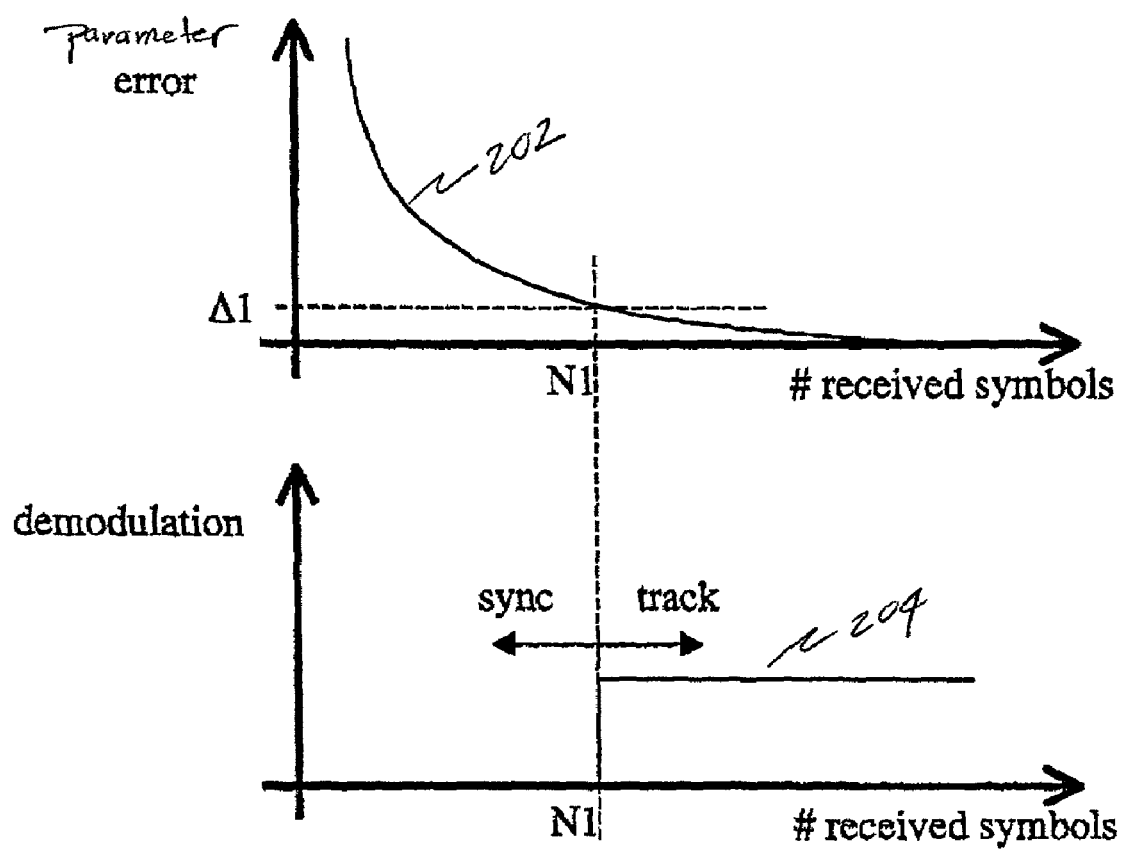
FIG. 2 is a diagram showing synchronization parameter error versus number of symbols received, and the relationship between parameter error and the synchronization and tracking phases of a synchronization scheme.

As discussed above, a certain degree of accuracy in the parameter estimates must be obtained before the demodulation process can be started, and any error in the parameter estimates will give rise to symbol errors during the demodulation process. The error in the parameter estimates is a function of the number of received symbols. This is shown more clearly in the top graph of FIG. 2. The error curve 202 shows that as more symbols are received and a greater amount of signal energy is available to train the receiver, the accuracy in the parameter estimates increases (i.e., the error decreases). When the error in the parameter estimates falls below an acceptable level $\Delta 1$, the receiver can begin demodulating the received symbols. By the time demodulation begins, N1 symbols have already been received. This shown by the demodulation curve 204, which is a step function rising at the value of N1 received symbols.

For non-data-aided synchronization schemes, these N1 symbols would have had to have been stored in a receive buffer for later demodulation during the tracking phase. This requires a significant amount of local storage to exist in the receiver. For data-aided synchronization schemes, the demodulation process must be delayed an amount of time equal to the time it takes to process the N1 symbols in order to reduce the parameter error to $\Delta 1$. During this delay, the transmitter user symbol information is unusable by the receiver.

Figure 3:
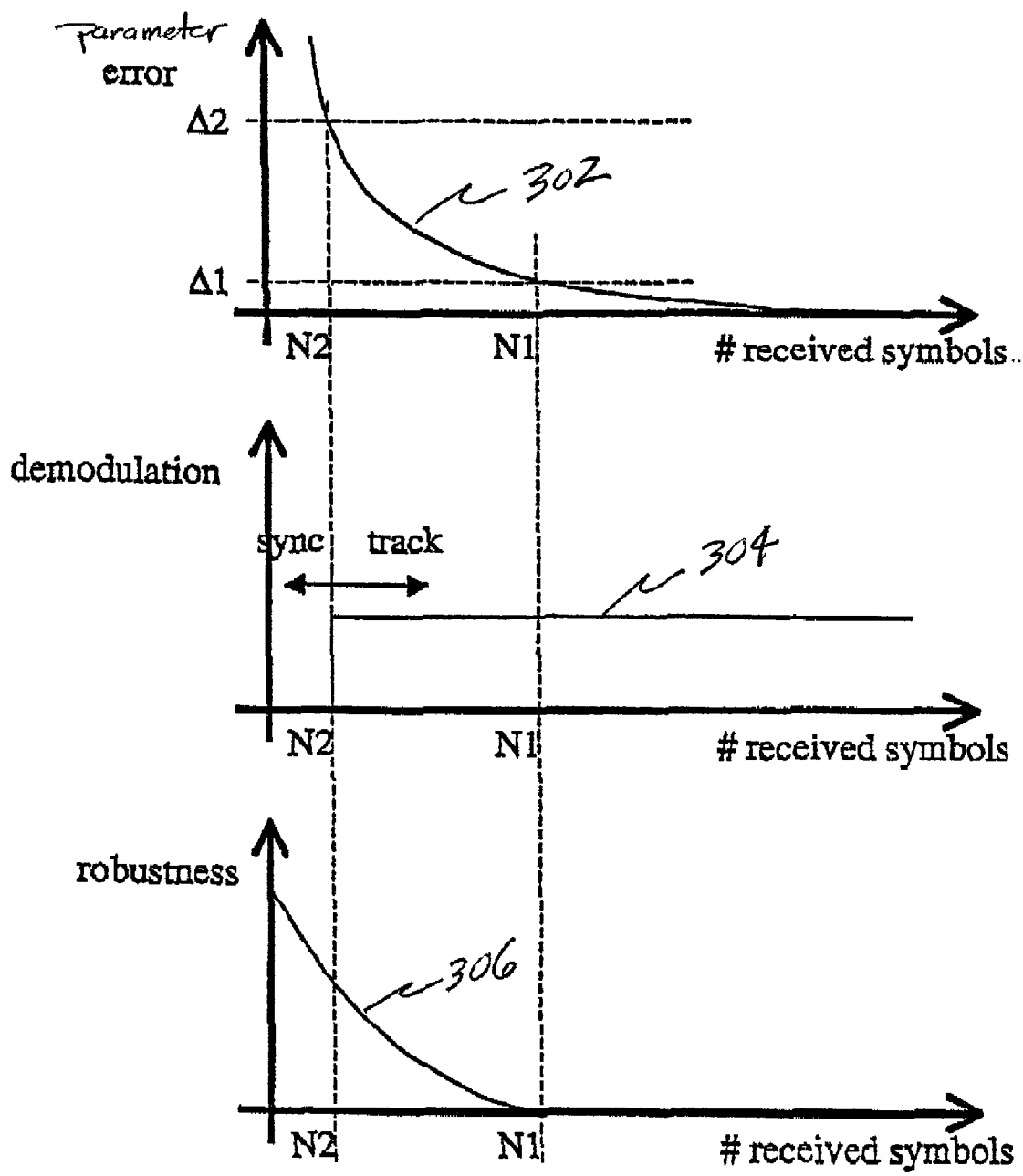
FIG. 3 is a diagram showing the synchronization parameter error and a robustness of an information stream versus the number of symbols received, and the relationship between parameter error, robustness, and the synchronization and tracking phases of a synchronization scheme.

FIG. 3 shows the operation of a receiver using a variably robust information stream according to an exemplary embodiment. Comparing the parameter error and demodulation curves 302 and 304 with the corresponding curves 202 and 204 of FIG. 2, it can seen that the demodulation of the information stream may begin earlier, at a point when only N2 symbols (N2<N1) have been received. At this point in the synchronization process, the error in the parameter estimates $\Delta 2$ is substantially higher than the acceptable level $\Delta 1$ needed to begin demodulation.

In order to reduce the symbol error probability $P_s$ to an acceptable level, additional robustness is added to the information stream as shown in curve 306. The added robustness has the effect of increasing the tolerance in the receiver to the parameter estimation error, such that $P_s$ is reduced for any given parameter error value when compared to the corresponding $P_s$ without added robustness. The amount of robustness added to the information stream is chosen such that the $P_s$ when N2 symbols have been received is at most equal to the $P_s$ after receiving N1 symbols with no robustness added to the information stream.

Just as in the case of training a receiver using an information stream having a constant robustness, as more symbols are processed by the receiver, the error in the parameter estimates is further reduced. The additional robustness may be removed from the information stream when the parameter error has been reduced to $\Delta 1$. It will be understood that more or less aggressive rates of adding robustness to the information stream may be employed depending on the type of added robustness (i.e., FEC and/or modulation type) that is employed.

The tracking phase, and thus the demodulation of the received symbols, may begin when the $P_s$ has been reduced to $P_{s1}$. This is shown by the demodulation curve 304 rising as a step function at the value of N2 received symbols. For non-data-aided synchronization schemes, the number of symbols that would have had to have been stored in the receiver before beginning demodulation has been reduced by (N2−N1) symbols. This allows a much smaller receive buffer to used for synchronization. For data-aided synchronization schemes, the amount of delay before the demodulation process can begin has been reduced by the amount of time required to process (N2−N1) symbols.

As briefly discussed above, the variable robustness that is added to the information stream may be applied in a number of ways. Two of the most common ways of changing the robustness of an information channel are by applying varying amounts of forward-error correcting (FEC) coding to the signal, and by changing the modulation format of the information stream.

Figure 4:
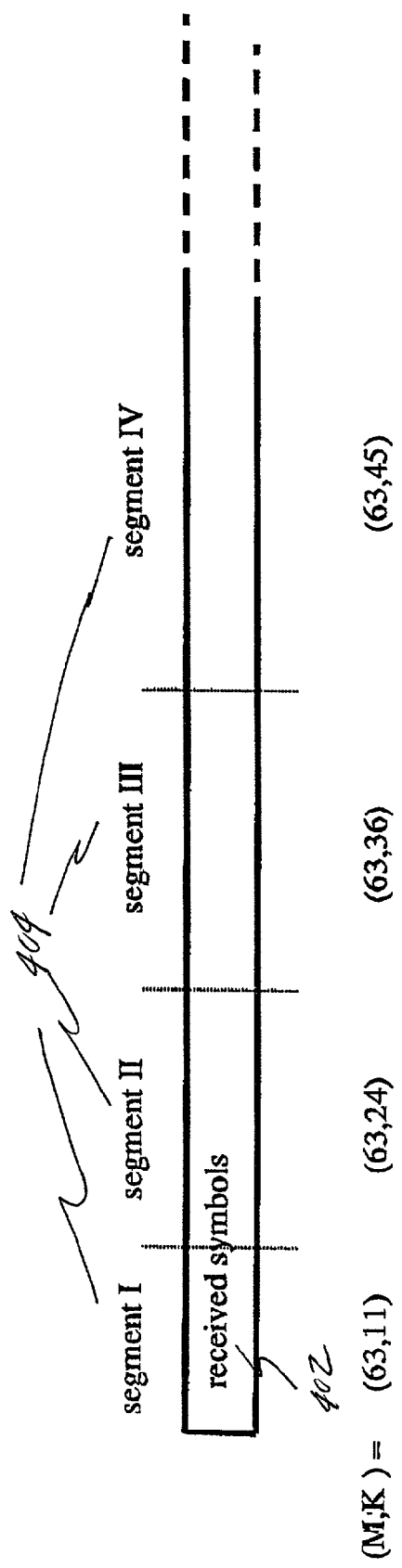
FIG. 4 is a diagram showing an increase in coding rate using block codes according to exemplary embodiments.

An example of applying a gradual diminishing FEC code to the information stream is shown in FIG. 4. This figure shows a block coding technique wherein blocks of K symbols 402 are mapped into a code word of length M, M being greater than K. The number (M−K) represents the number of parity bits added to the blocks. The ratio (K/M) is referred to as the code rate. The lower the code rate, the more parity bits are present in the information stream, and consequently the more robust the transmission. The illustrated technique may be applied on a packet basis when using a non-data-aided synchronization scheme, or may be applied to the training sequence at the start of a packet when using a data-aided synchronization scheme.

In the exemplary embodiment of FIG. 4, four information segments 404 are shown. For each of the segments 404, a different coding rate has been selected. In this example, Bose-Chaudhuri-Hocquenghem (BCH) codes having a constant block length (M=63), and an increasing number of information bits (K=11, 24, 36, and 45) are applied. It will be understood than any type of block codes may be used. Moreover although four segments are shown in example, any number of segments may be used to implement the variable robustness scheme. The number of segments and the number of symbols in each segment are design parameters that may be optimized depending on the modulation scheme, the coding rate, and the synchronization method used.

As the FEC code rate for each additional segment is increased, the corresponding robustness for the segments decreases. The last segment may contain the remainder of a conventional packet. That is, in this last segment, the coding applied may be identical (i.e., no additional coding) to the coding rate used with a conventional synchronization scheme.

The number of segments used for the variable robustness coding scheme, as well as the number of symbols included per segment, may be predetermined design constants that are known to both the transmitter and the receiver at the time a connection is established. This will avoid having to include additional signaling overhead to the information stream. It will be further understood that the dividing of the information stream into segments need not be related to the location of the training sequences within a packet. As such, the segmentation may be used to optimize the synchronization and tracking performance of the receiver independent of the packet format and contents.

Figure 5:
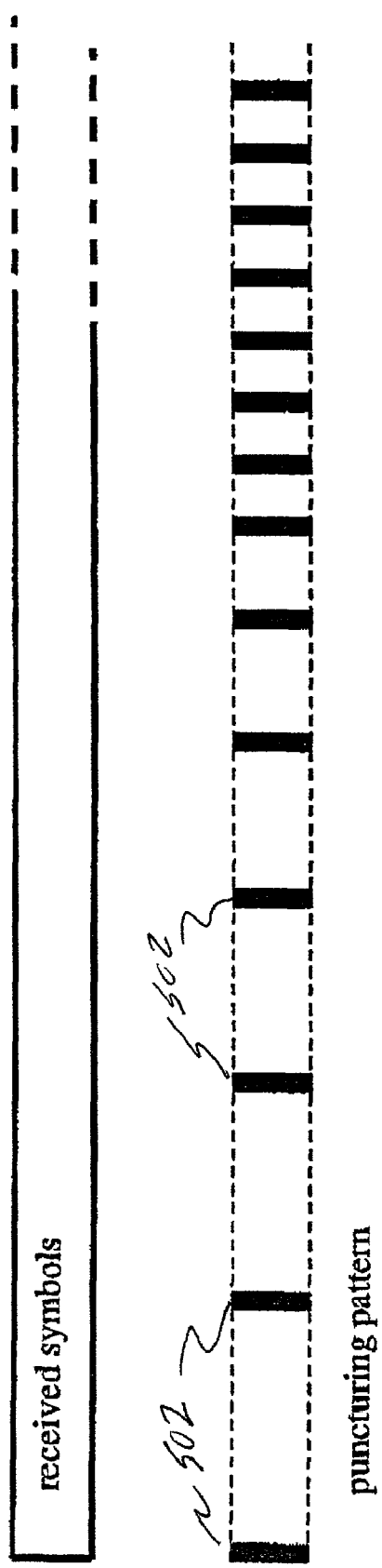
FIG. 5 is a diagram showing an increase in coding rate using punctured convolution coding according to exemplary embodiments.

Another exemplary variable robustness coding scheme is shown in FIG. 5. This scheme is similar to that shown in FIG. 4, but uses convolutional coding of the information stream with variable puncturing instead of variable block coding. As such, the segmentation of the information stream is not required in this exemplary embodiment. In this embodiment, a fixed-rate convolutional code, e.g., K=9, r=½, is first applied to the information stream. Next, a variable puncturing scheme is applied to the convolutional coded stream, wherein symbols 502 are punctured (or removed) from the coded stream at increasing rate. As the rate of puncturing the stream increases, the FEC code rate also increases, e.g., from r=½ to say r=⅞, and the robustness of the information stream is correspondingly decreased. As with the segmentation pattern discussed above, the convolutional coding parameters and the puncturing pattern may be predetermined design parameters known to both the transmitter and the receiver at the time of establishing a connection.

Instead of applying varying amounts of FEC coding to the beginning of the information stream, the stream may be divided into segments, and a different modulation scheme then applied to each of the segments. For the lower segment numbers, more robust modulation schemes may be applied, whereas less robust modulation schemes may be applied to the higher segment numbers. The robustness of a modulation scheme is determined by its sensitivity to frequency, phase, or timing errors in the information stream. As a general rule, less robust schemes offer higher data rates than do more robust modulation schemes, as more bits per second may accommodated in the transmitted signal per hertz-bandwidth.

Figure 6:
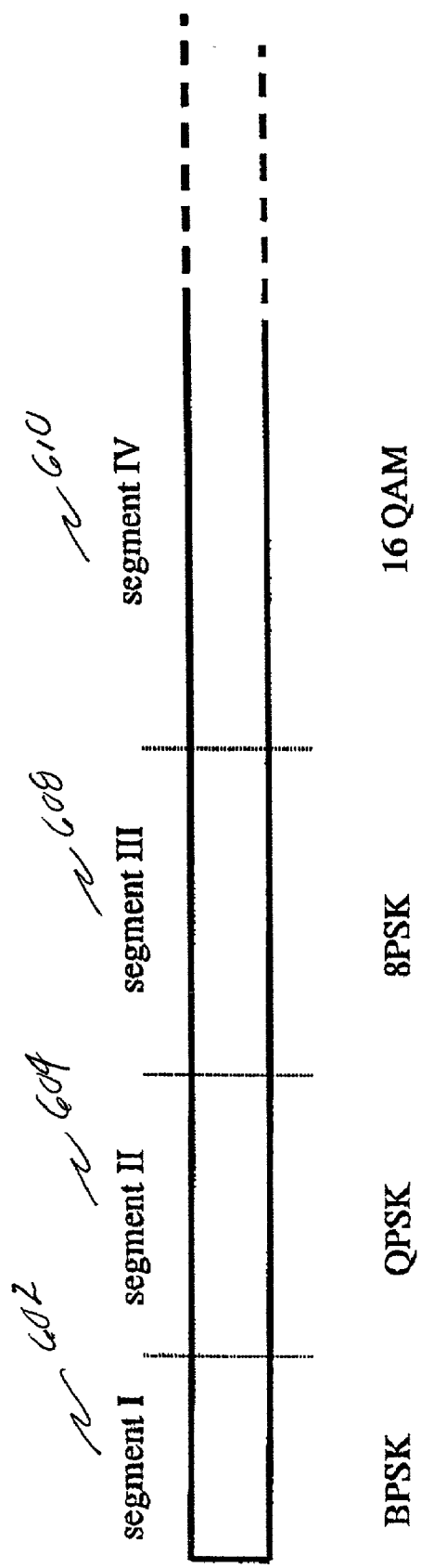
FIG. 6 is a diagram showing an increase of modulation complexity according to exemplary embodiments.

An exemplary embodiment of an information stream having varying modulation schemes applied to the stream segments is shown in FIG. 6. The first segment 602 is shown as using Binary Phase Shift Keying (BPSK) to modulate the information stream. The next segment 604, uses Quadrature Phase Shift Keying (QPSK). The third segment 606 uses 8-Phase Shift Keying (8PSK). The final segment 608, as well as the remainder of the stream, uses Quadrant Amplitude Modulation (QAM) having sixteen possible four-bit patterns, determined by the combination of phase and amplitude.

It will be understood that the modulation schemes and the relative size of the information stream segments shown in FIG. 6 are merely illustrative, and that any modulation scheme and segment size may be used. As with the previously described embodiments, the modulation schemes and segment sizes may be predetermined design parameters known to both the transmitter and the receiver at the time of establishing a connection, to avoid adding signaling overhead to the information stream.

Varying FEC coding and modulation schemes may also be applied to the information stream together. Several combination are possible. For example, either a separate FEC code rate or modulation scheme may be applied to a given segment in the stream. Alternatively, a combined FEC code and modulation scheme may be simultaneously applied to the segments. This coded-modulation scheme, first introduced by Ungerboeck, is often referred to as trellis-coded modulation (TCM).

Figure 7:
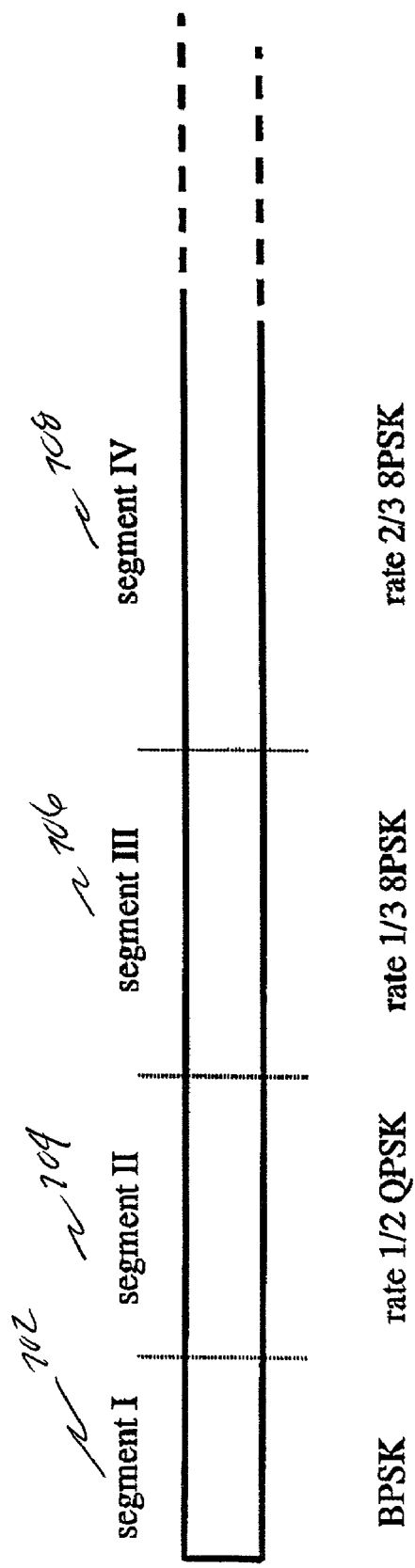
FIG. 7 is a diagram showing an increase in trellis-coded modulation complexity according to exemplary embodiments.

FIG. 7 shows an information stream having TCM of varying robustness levels applied to the stream. In this example, the first segment 702 uses a modulation scheme, BPSK, having a small number of constellation points (or data encoding), and no error coding. The next segment 704 uses a more complex modulation scheme (e.g., more constellation points), QPSK, and adds half-rate FEC coding to the segment. Segments three 706 and four 708 use an even more aggressive modulation scheme. The code rate is first reduced (i.e. more coding) and then increases (i.e. less coding) as the segment numbers increase.

In each of the above described embodiments, the technique of providing additional robustness to the information stream has been limited to providing the added robustness at the beginning of the information stream. It will be understood that these techniques are equally applicable for data-aided synchronization schemes where the training sequence is inserted in the middle of the information stream (or packet).

Figure 8:
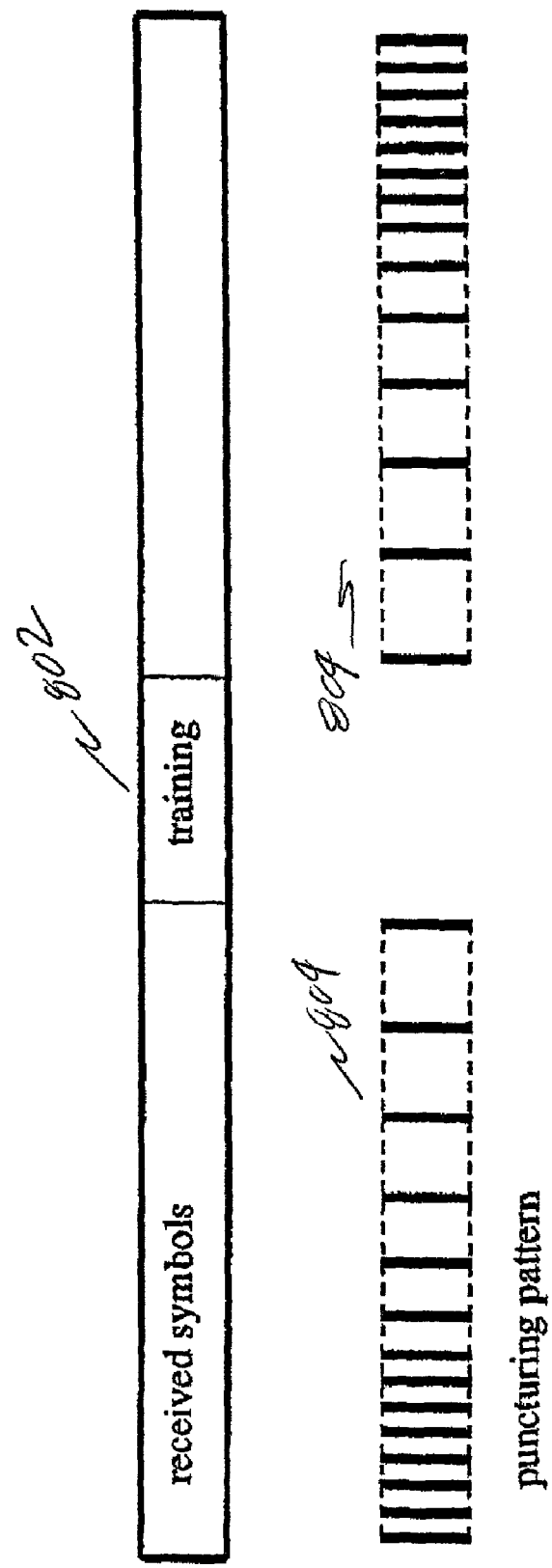
FIG. 8. is a diagram showing an increase in coding rate using punctured convolution coding according to exemplary embodiments.

FIG. 8 depicts such an information stream used with a data-aided synchronization scheme. In the example of this figure, the training sequence 802 exists in the center of the packet. In such a situation, the payload must be demodulated starting at the center of the packet. Thus, additional robustness must be added to the information symbols closest to the training sequence.

For example, when applying the punctured convolutional coding scheme of FIG. 5 to this type of information stream, the puncturing pattern 804 is applied so as to increase when moving away from the center of the packet (or training sequence 802). It will be understood that adding robustness with any other of the above-mentioned techniques can be applied to this type of data-aided information stream in a analogous manner.

It will further be understood that any of the above proposed schemes may automatically adapt to varying packet lengths. For example, in FIG. 4, four segments are shown using four different coding rates. The packet length may be shortened without having any impact on the synchronization performance. If the packet is shortened, the later defined segments are automatically canceled from the synchronization process. Thus, as in the exemplary embodiment shown in FIG. 4, information streams having very short packet lengths may use only the first two segments, or perhaps only the first segment.

Other techniques that provide robustness to the symbols that differ from FEC coding and robust modulation may be used. Note also that the reduction in robustness need not necessarily bear any relation to the information contents in the packet. For example, the segment boundaries do not have to align with boundary fields in the packet as is the case with a synchronization word or a packet header.

It should be emphasized that the terms "comprises" and "comprising", when used in this specification as well as the claims, are taken to specify the presence of stated features, integers, steps or components; but the use of these terms does not preclude the presence or addition of one or more other features, integers, steps, components or groups thereof.

The various aspects of the invention have been described in connection with a number of exemplary embodiments. To facilitate an understanding of the invention, many aspects of the invention were described in terms of sequences of actions that may be performed by the elements of a computer system. It will be recognized that in each of the embodiments, the various actions could be performed by specialized circuits (e.g., discrete logic gates and other circuitry interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

The invention has been described with reference to particular embodiments. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for synchronization in radio communication systems, the method comprising the steps of:
    encapsulating symbols in an information stream;
    modulating the information stream; and
    sending the modulated information stream over a communication channel;
    wherein symbols in a group of symbols have robustness levels that decrease from a start of the group to an end of the group according to a predetermined pattern, and signal in information indicating the decrease in robustness level is omitted from the information stream.

2. The method of claim 1, wherein the step of encapsulating symbols comprises the steps of:
    adding Forward Error Correction (FEC) coding to the group of symbols in the information stream using at least two different coding rates; and
    varying the coding rates among the group of symbols to decrease the robustness level.

3. The method of claim 2, wherein the group of symbols to which the FEC coding is added includes a symbol adjacent to where a demodulation of the information stream begins.

4. The method of claim 1, wherein the step of modulating the information stream comprises the steps of:
    modulating the group of symbols in the information stream using at least two different modulation schemes; and
    varying the modulation schemes among the group of symbols to decrease the robustness level.

5. The method of claim 4, wherein the group of symbols modulated using at least two different modulation schemes includes a symbol adjacent to where a demodulation of the information stream begins.

6. The method of claim 4, wherein the step of encapsulating symbols comprises the step of:
    adding Forward Error Correction (FEC) coding to the group of symbols in the information stream;
    wherein the varying of the modulation schemes and the adding of FEC coding decrease the robustness level.

7. The method of claim 4, wherein the step of encapsulating symbols comprises the steps of:
    adding Forward Error Correction (FEC) coding to the group of symbols in the information stream using at least two different coding rates; and
    varying the coding rates among the symbols;
    wherein the varying of the modulation schemes and the varying of the coding rates decrease the robustness level.

8. The method of claim 7, wherein the symbols among which the modulation schemes vary and the symbols among which the coding rates vary are different.

9. The method of claim 7, wherein the symbols among which the modulation schemes vary and the symbols among which the coding rates vary are the same.

10. The method of claim 1, wherein the step of encapsulating symbols comprises the steps of:
    encoding symbols in the group using convolutional coding;
    puncturing the encoded symbols; and
    varying a rate at which the encoded symbols are punctured in accordance with the predetermined pattern, whereby the robustness level decreases.

11. The method of claim 10, wherein the puncturing of the encoded symbols occurs adjacent to a portion of the information stream where a demodulation of the information stream begins.

12. The method of claim 1, further comprising the steps of:
receiving the modulated information stream from the communication channel; and
demodulating the information stream only after the group of symbols has been received.

13. The method of claim 1, wherein the information stream is comprised of packets and the group of symbols is included in a single packet.

14. The method of claim 13, wherein the packet that includes the group of symbols includes a training sequence.

15. An apparatus for synchronization in radio communication systems, comprising:
logic that encapsulates symbols in an information stream;
a modulator for modulating the information stream; and
a transmitter for sending the modulated information stream with a first robustness level over a communication channel;
wherein the logic encapsulates symbols in a group of symbols with robustness levels that decrease from a start of the group to an end of the group according to a predetermined pattern, and signaling information indicating the decrease in robustness level is omitted from the information stream.

16. The apparatus of claim 15, wherein the logic that encapsulates symbols comprises:
logic that adds Forward Error Correction (FEC) coding to the group of symbols in the information stream using at least two different coding rates; and
logic that varies the coding rates among the group of symbols to decrease the robustness level.

17. The apparatus of claim 16, wherein the group of symbols to which the FEC coding is added includes a symbol adjacent to where a demodulation of the information stream begins.

18. The apparatus of claim 15, wherein the modulator comprises:
logic that modulates the group of symbols in the information stream using at least two different modulation schemes; and
logic that varies the modulation schemes among the group of symbols to decrease the robustness level.

19. The apparatus of claim 18, wherein the group of symbols modulated using at least two different modulation schemes includes a symbol adjacent to where a demodulation of the information stream begins.

20. The apparatus of claim 18, wherein the logic that encapsulates symbols comprises:
logic that adds Forward Error Correction (FEC) coding to the group of symbols in the information stream;
wherein the varying of the modulation schemes and the adding of FEC coding decrease the robustness level.

21. The apparatus of claim 18, wherein the logic that encapsulates symbols comprises:
logic that adds Forward Error Correction (FEC) coding to the group of symbols in the information stream using at least two different coding rates; and
logic that varies the coding rates among the symbols;
wherein the varying of the modulation schemes and the varying of the coding rates decrease the robustness level.

22. The apparatus of claim 21, wherein the symbols among which the modulation schemes vary and the symbols among which the coding rates vary are different symbols.

23. The apparatus of claim 21, wherein the symbols among which the modulation schemes vary and the symbols among which the coding rates vary are the same symbols.

24. The apparatus of claim 15, wherein the logic that encapsulates symbols, comprises:
an encoder for coding symbols in the group using convolutional coding;
logic that punctures the coded symbols; and
logic that varies a rate at which the encoded symbols are punctured in accordance with the predetermined pattern, whereby the robustness level decreases.

25. The apparatus of claim 24, wherein the puncturing of the encoded symbols occurs adjacent to a portion of the information stream where a demodulation of the information stream begins.

26. The apparatus of claim 15, wherein the information stream is comprised of packets and the group of symbols is included in a single packet.

27. The apparatus of claim 26, wherein the packet that includes the group of symbols includes a training sequence.

28. An apparatus for synchronization in radio communication systems, comprising:
a receiver for receiving a modulated information stream including symbols; and
a demodulator for demodulating the information stream after a first number of symbols have been received, wherein symbols in a group of symbols have robustness levels that decrease from a start of the group to an end of the group according to a predetermined pattern; and signaling information indicating the decrease in robustness level is omitted from the information stream; whereby the first number of symbols is less than a second number of symbols that would have to be received to demodulate a corresponding information stream sent over the communication channel only at the robustness level of a symbol at the end of the group.

29. A system for synchronization in radio communication systems, comprising:
logic that encapsulates symbols in an information stream;
a modulator for modulating the information stream;
a transmitter for sending the modulated information stream over a communication channel;
logic that reduces the level of robustness of symbols in a group of symbols in the information stream according to a predetermined function;
a receiver for receiving the modulated information stream from the communication channel; and
a demodulator for demodulating the information stream after a first number of symbols have been received, wherein the symbols in the group of symbols have robustness levels that decrease from a start of the group to an end of the group according to the predetermined function; and signaling information indicating the decrease in robustness level is omitted from the information stream; whereby the first number of symbols is less than a second number of symbols that would have to be received to demodulate a corresponding information stream sent over the communication channel only at the robustness level of a symbol at the end of the group.

* * * * *